United States Patent Office 3,748,291
Patented July 24, 1973

3,748,291
POLYURETHANE TIRE YARN FINISH ADDITIVE
Roop S. Bhakuni, Copley, and Joseph L. Cormany, Jr., Akron, Ohio, assignors to The Goodyear Tire & Rubber Company, Akron, Ohio
No Drawing. Continuation-in-part of application Ser. No. 78,251, Oct. 5, 1970. This application Oct. 29, 1971, Ser. No. 194,044
Int. Cl. C08g 51/22
U.S. Cl. 260—18 TN   1 Claim

ABSTRACT OF THE DISCLOSURE

Polyurethane alone or in combination with epoxides or in combination with melamine/formaldehyde resins as adhesion promoting agents are added to the finish or spinning composition applied to tire yarn used in making tire reinforcing cord as a means of promoting adhesion between the cord and the rubber when using a conventional R/F/L adhesive.

---

This application is a continuation-in-part application of our application Ser. No. 78,251 filed Oct. 5, 1970.

This invention relates to an improved tire yarn finish and to an improved laminate of rubber reinforced with a cord made of the yarn coated with the finish containing an adhesion promoting agent which promotes a bond between the cord and the rubber as in a pneumatic tire when using a conventional R/F/L adhesive applied to the finish treated cord prior to embedment in the rubber.

Pneumatic tires are being subjected to increasingly severe operating conditions, especially high speeds, heavy loads, and accelerated braking and the performance of the tire under these conditions depends in large part upon the durability of the adhesive bond developed between the reinforcing cord and the rubber being reinforced. The bond is formed between active sites in the rubber and on the surface of the cord. The filaments in the yarn used in making the cord are coated with a finish to provide proper lubrication during the drawing and twisting operations in making the cord. It has been observed that the finish interferes with maximum bonding of the cord to the rubber.

It has now been discovered that this difficulty can be overcome without loss of any function performed by the finish by adding an adhesion promoting agent to the finish.

Even through the adhesion promoting agent is added to the finish, the finish still achieves a satisfactory lubrication of the filaments with a minimum of friction throughout various drawing, spooling, winding, transporting, twisting, cording, weaving and similar textile operations while still providing improved bonding between the cord and the rubber.

It is especially desirable to apply this adhesion promoting agent to the finish immediately after the filaments have been spun from, for example, molten polyester and before stretching or fiber orientation of the polyester in a conventional manner as by dipping, spraying, or padding. Thereafter the yarn is heated over hot rolls at about 160° C. to about 255° C. in steps normally required for drawing and heat setting the filaments. The filaments are then made into a tire cord and a modified resorcinol/formaldehyde adhesive dip (R/F/L) is applied in a conventional manner to the cord.

The tire yarn finish base coating composition of this invention may be applied to many types of tire yarn including such natural fibers as cotton, regenerated cellulose fibers such as rayon, synthetic fibers such as polyamides and known generally as nylon, synthetic fibers of polyacrylonitrile generally known as Acrylon, and synthetic fibers of polyesters, specifically fibers of polyethylene terephthalate known generally by the trade names Dacron, Vycron, etc.

Finishes useful in this invention are those used in the fiber industry primarily as a lubricant to minimize friction between the filaments and metal rolls during the drawing operation. Generally these finishes comprise a lubricating oil, an antistatic agent, and an emulsifier. The lubricating oils include such substances as palm oil, coconut oil, cottonseed oil, mineral oil, glycerides, polyglycol esters, butyl stearate, octyl stearate, esters of oleic acid, trimethylol propane/caprylic acid esters, 2-methyl-2-propyl-propane diol-1,3-dilaurate and 2-ethyl-2-butyl-propane diol-1,3-dilaurate. These lubricants are dispersed in water preferably with the aid of an emulsifying agent including such surface active organic compounds as the polyethoxylate of fatty acids, higher fatty alcohols, sorbitol esters or sorbitans, phosphate esters, sulfonated aromatic petroleum hydrocarbons, sulfonated naphthenates, sulfated vegetable oils, polyoxyethylene esters and ethers, polyglycerol esters and glycerol mono-di-fatty acid esters.

The finish may also contain an antistatic agent to reduce the electrostatic charge of the filament during its processing into a cord or fabric. Examples useful in this invention include such cationic agents as quaternary ammonium-, pyridinium-, imidazolinium-, and quinolinium function, phosphated alcohols and ethoxylated amides.

Water miscible organic solvents such as benzene may also be used in forming the finish for such lubricants as paraffin oils, i.e., saturated aliphatic hydrocarbons boiling in the gasoline range.

The "nonionic emulsifying agents" are referred to in detail by Swartz et al. in "Surface Active Agents" published by Interscience Publications Incorporated (1949) starting at page 202, and their use with textile lubricants is described in detail by Swartz et al. in "Surface Active Agents and Detergents," Volume II, by Interscience Publication Incorporated (1958) starting at page 596. The terms "fatty acids" and "fatty alcohols" used in connection with describing the emulsifying agents refer to fatty acids and their corresponding alcohols having an aliphatic hydrocarbon chain of from C–8 to C–18 or more and are usually derived from natural sources and are usually mixtures of various chain length but the corresponding synthetic compounds may also be used.

The finish is prepared generally by mixing a blend of the lubricating oil with water to a 25 percent solids concentration and then adding the adhesive bond promoting agent to the oil-water mixture, or to the oil prior to mixing with water, and forming an emulsion thereof in warm water and adding sufficient alkali if necessary to adjust the pH from about 8.3 to about 8.5.

It has been found that the aqueous polyurethane dispersions will produce the desired improvement in bond strength between the rubber and the polyester tire cord when added to the finish.

The aqueous polyurethane dispersions are prepared by reacting an organic diisocyanate with polyalkylene ether glycols of molecular weight of at least 750. Specifically a dispersion is made by reacting a polytetramethylene ether glycol of molecular weight between 750 and 4,000 with an aromatic diisocyanate in molar ratio of glycol to diisocyanate from 1:1.2 to 1:2 and then treating the reaction product with an organic acid (12C) and the treated product then poured into at least an equal volume of water containing an alkali metal hydroxide and agitated to form a stable dispersion. Another example of a polyurethane dispersion useful as a finish additive is made by vigorously agitating a mixture of 72 parts by weight of a 675 molecular weight polyoxypropylene glycol, 28 parts of tolylene diisocyanate (80/20:2,4/2,6), 40 parts by weight of toluene, 3 parts of sodium lauryl sulfate, 115 parts of water and an amount of 4,4'-methylene-bis-(2-chloraniline) sufficient to produce the polyurethane dispersion having an $NH_2/NCO$ ratio of .95/1 and .05 part of stannous octoate, and hereinafter referred to as PPGTD. Combinations of these polyurethane dispersions with epoxy resins may be used as well as combinations with melamine formaldehyde resins.

Polyepoxides that may be used in combination with polyurethane are any of the polyepoxides disclosed in U.S. Pat. 3,247,043 and which are substantially soluble in water or emulsifiable therein. Particularly desirable polyepoxides are those based on the reaction of eipchlorohydrin with pentaerythritol (conveniently referred to as EPCP) and with glycerine (conveniently referred to as EPCG).

The melamine-formaledhyde resins hereinafter referred to as MF which are useful in combination with polyurethane in the practice of this invention are the adducts of formaldehyde and melamine of sufficiently low molecular weight to be water-dispersible, and the lower alkyl ethers, especially the methyl ether, of the above described melamine-formaldehyde adducts. The etherified (or alkylated) melamine-formaldehyde adducts may be partially or fully etherfied, i.e., the hydroxymethyl substituent of the adducts may be partially or substantially fully converted to lower aky ether groups. Also mixtures of melamine-formaldehyde adducts having varying degrees of etherification may be mixed with each other or with melamine-formaldehyde adducts having no ether substituents. The term "melamine-formaldehyde resin" is intended to include materials of the above description. Descriptions and methods of preparation of materials of this type are included in Chapter VIII, "Condensations with Formaldehyde," in Schildknecht, Polymer Processes, Vol. X of High Polymer Series, Interscience Publishers Inc., New York, pages 295–350.

The adhesion promoting agents are added to the finish in amounts from about .05 percent to about 30 percent depending on the particular agent being used per 100 parts of lubricating oil present. The finish when applied to the filament is present in an amount between about .3 to about 1.5 parts per 100 parts of filament. The adhesion promoting agent may be added to the finish by blending into the oil or by blending into the water before or after the oil is added to the water or dissolved in a solvent and then blended into the oil. The pH of the mixture is to be adjusted as noted before depending upon the adhesion promoting agent and emulsion stabilizer used.

The proportions of the components of the tire yarn finish of this invention may vary over a wide range. In general, finish compositions may be present in the following general amounts based on the total solids present.

| Ingredients | Amount Preferred | Range |
|---|---|---|
| Lubricant | 70 | 60–75 |
| Antistatic agent | 20 | 10–30 |
| Emulsifier | 10 | 10–20 |

The finish composition is applied to the tire yarn at a point below the spinneret in the form of a dilute aqueous emulsion, the concentration of which is varied as desired in accordance with the amount of finish to be applied to the yarn. The dried yarn may contain from about .3 to 1.5 percent by weight of the yarn of the finish composition.

A polyethylene terephthalate filament was coated in each instance with the finish containing the adhesion promoting agent by a scotch roll using a 25 percent solids emulsion of the finish on the filament at a point below the exit end of a 190 hole spinneret. The filaments are then spun at a spinning speed of 150 yards per minute to give a single spun yarn having a total denier of approximately 7800, which yarn is then passed to a pair of rotating heated rolls and then passed around a pair of heated draw rolls rotating at a speed to impart a draw ratio of about 6 to 1 to give a total denier of approximately 1300 and then wound on a bobbin. The yarn is plied 8 turns per inch, 3 plies are then twisted in reverse direction 8 turns per inch to form a cord referred to as 1300/3,8/8.

The polyester cord having the modified finish of this invention is then treated with a 20 percent solids dispersion of a conventional R/F/L adhesive composition made in accordance with the following formula in amount sufficient to give a dry solids pick up of from 6 to 7 percent.

R/F/L adhesive

| Ingredients: | Parts |
|---|---|
| Resorcinol | 98 |
| Formaldehyde (37%) | 53 |
| Terpolymer rubber latex of styrene/butadiene-1,3/vinylpyridine 15/70/15 (41%) | 1152 |
| Water | 543 |

The R/F/L adhesive composition was prepared by adding 98 parts of the resorcinol to 196 parts of water, followed by the addition of 53 parts of formaldehyde. The resulting mixture was aged for one hour and then 1152 parts of terpolymer rubber latex was added. The resulting mixture was aged for a period of 72 hours. After aging, the balance of the water was added. To 65 parts of this R/F/L composition was added 35 parts of a resinous formula: 110 parts of resorcinol, 25 parts by volume of formalin (37% formaldehyde in methanol and water), and 20 parts by volume of water was reacted together in a reaction vessel equipped with both heating and cooling coils, a reflux condenser and a suitable agitator. The mixture was heated to reflux temperature (100° C.) and allowed to remain at this temperature for 15 minutes, after which an additional 30 parts by volume of formalin was added to the reaction mixture over a period of 10 minutes. After being refluxed for an additional 30 minutes, the resin formed in the reaction vessel was allowed to cool to room temperature. A thick, syrupy resin (for convenience referred to as Resin A) containing 60 percent solids, a viscosity of 750 cps. and a pH of 7 was obtained.

Twenty parts of the Resin A described above is reacted with 6 parts of polymethylene polyphenylisocyanate for 48 hours at 72° F. At the end of this time, the resulting reaction mixture is treated with 0.1 part of sodium hydroxide and 100 parts of water. The resulting neutralized resin-blocked polyisocyanate was allowed to age for 8 hours to produce a clear supernatent layer of soluble resin-blocked polyisocyanate (and for convenience to be referred to as Resin B).

To 65 parts of the R/F/L adhesive composition described above is added 35 parts of Resin B and allowed to age at 72° F. for 4 hours.

The polyester cord 1300/3 (Dacron) is passed through a dip tank containing this adhesive. The dipped cord is then dried at 450° F. and embedded in rubber compounded as shown below.

| Ingredients | Parts by weight Amount used | May be used |
|---|---|---|
| 1. Natural rubber | 70 | 0–100 |
| 2. OE/SBR 1778 (styrene/butadiene-1,3 23.5/76.5 copolymer) (plus 37½ parts oil per 100 SBR) | 27.5 | 100–0 |
| 3. Cis 1,4-polybutadiene | 10 | 0–50 |
| 4. Carbon black (reinforcing agent) | 40 | 25–100 |
| 5. Zinc oxide (activator of cure) | 4 | 2–10 |
| 6. Stearic acid (activator of cure) | 2 | 1.5–3.0 |
| 7. Primary accelerator (2,2'-dithiobisbenzothiazole) | 1.25 | .5–3.0 |
| 8. Pine oil (softener) | 10 | 2–50 |
| 9. Secondary accelerator (tetramethyl thiuram disulfide) | .10 | .05–1.0 |
| 10. Antioxidant | .60 | .1–4 |
| 11. Sulfur (vulcanizing agent) | 2.5 | 1.0–5.0 |

In compounding the rubber stock in accordance with the formulation set forth above, a masterbatch of ingredients 1 and 2 are made with the carbon black and mixed on a mill to a temperature of about 110° C. and may be mixed at a temperature as high as 140° C. The resulting carbon black masterbatch is then cooled and the remaining compounds are mixed into the batch in the order indicated above to a temperature of about 70° C. and may be mixed at a temperature as high as 100° C.

The following ratings are based on a control using the identical finish, cord and rubber but without the addition of an adhesion promoting agent to the finish. Amount of additive is in percent by weight based on the total weight of the finish solids present in the finish.

| Example | Additive | Amount (percent) | Rating Peel force [1] | Fatigue [2] |
|---|---|---|---|---|
| 1 | PPGTD | 5.0 | 109 | 240 |
| 2 | {PPGTD EPCP | {11.25 3.75} | 138 | 142 |
| 3 | {PPGTD MF | {13.5 1.5} | 140 | 163 |

[1] Peel adhesion is determined in the following manner. Onto the surface of a 12 mil thick sheet (12″ x 12″) of rubber (MRS) is laid the treated cords at the rate of 18 per inch which are then covered with a second sheet (12″ x 12″) of 12 mil gauge rubber (MRS). This "sandwich" arrangement of rubber cord and rubber is then doubled onto itself with a piece of Holland cloth extending one inch into the doubled assembly from the open end from which assembly is clicked 1″ x 3″ samples, which samples are then cured in a mold at 340° F. for 10 minutes. The cured sample is then placed in an Instron machine, heated at 250° F. and the two strips of rubber separated by the Holland cloth are then moved in opposite directions at the rate of 2″ per minute to determine the average force (A) required to separate the remaining portion of the sample. Depending on the adhesion developed between the cord and rubber, separation either occurs at the rubber/rubber interface or the rubber/cord interface or at both in varying amounts. After separation has been completed, the amount of rubber remaining (B) on the cord is determined by visual inspection.

[2] Fatigue data based on heat durability was obtained on a tube of rubber reinforced with the cord treated in the manner described herein and tested in accordance with the requirements of ASTM D-885-59T Sec. 42.

The present invention may be used in the manufacture of a pneumatic tire of conventional present day design as shown, for example, in such U.S. Pats. as 3,157,218; 3,160,191; 3,160,192; 3,217,778; 3,225,810; 3,225,812; 3,244,215; 3,253,633 and 3,253,638 all of which show a vulcanized rubberized fabric carcass of generally toroidal shape having a tread portion superimposed and bonded to the crown area of the carcass and plies of rubberized fabric forming sidewalls extending from the tread over the carcass to the bead portion.

While certain representative embodiments and details have been shown for the purpose of illustrating the invention, it will be apparent to those skilled in this art that various changes and modifications may be made therein without departing from the sprit or scope of the invention.

What is claimed is:

1. A tire yarn finish consisting essentially of from about 60 to 70% of a lubricating agent, from about 10 to 30% of an antistatic agent, water, from about 10 to 20% of an emulsifier, the percentages being based on the total solids present in the finish, and a polyether-polyurethane aqueous dispersion resulting from the reaction of an aromatic diisocyanate with a polyalkylene ether glycol of a molecular weight of from about 750 to about 4000 in a molar ratio of glycol to diisocyanate of 1:1.2 to 1:2, and mixtures with a member selected from the group consisting of a water dispersible melamine formaldehyde resin and the polyepoxides resulting from the reaction of epichlorohydrin with a composition selected from the group consisting of pentaerythritol and glycerine.

References Cited
UNITED STATES PATENTS

| | | | |
|---|---|---|---|
| 3,179,547 | 4/1965 | Kigane et al. | 156—315 |
| 3,240,650 | 3/1966 | Atwell | 156—315 |
| 3,464,878 | 9/1969 | Schwarz | 156—331 |
| 3,325,333 | 6/1967 | Kigane et al. | 156—331 |
| 2,902,398 | 9/1959 | Schroeder | 156—315 |
| 3,610,311 | 10/1971 | Simons | 57—153 |
| 3,458,989 | 8/1969 | O'Brien et al. | 57—153 |
| 3,309,861 | 3/1967 | Pierson et al. | 57—153 |
| 3,673,022 | 6/1972 | Iwami et al. | 156—314 |
| 3,491,050 | 1/1970 | Keberle et al. | 156—331 |

DONALD E. CZAJA, Primary Examiner

E. C. RZUCIDLO, Assistant Examiner

U.S. Cl. X.R.

57—153; 156—314, 315, 331; 260—29.4 UA, 859 R

PO-1050
(5/69)

UNITED STATES PATENT OFFICE
CERTIFICATE OF CORRECTION

Patent No. 3,748,291            Dated July 24, 1973

Inventor(s) Roop S. Bhakuni and Joseph L. Cormany, Jr.

It is certified that error appears in the above-identified patent and that said Letters Patent are hereby corrected as shown below:

Column 3, line 29 "aky" should be -- alkyl --.

Column 3, the table, lines 60-63, the amounts in the "Preferred" and the "Range" columns should each have a -- % -- sign after each amount.

Signed and sealed this 1st day of October 1974.

(SEAL)
Attest:

McCOY M. GIBSON JR.
Attesting Officer

C. MARSHALL DANN
Commissioner of Patents